United States Patent
Zock

(10) Patent No.: US 12,060,940 B2
(45) Date of Patent: Aug. 13, 2024

(54) UPGRADED SHIFT STAR FOR ALL-TERRAIN VEHICLES AND A METHOD OF IMPROVING THE TRANSMISSION THEREOF

(71) Applicant: Richard Mellick Zock, Lapeer, MI (US)

(72) Inventor: Richard Mellick Zock, Lapeer, MI (US)

( * ) Notice: Subject to any disclaimer, the term of this patent is extended or adjusted under 35 U.S.C. 154(b) by 230 days.

(21) Appl. No.: 17/815,717

(22) Filed: Jul. 28, 2022

(65) Prior Publication Data

US 2024/0035568 A1 Feb. 1, 2024

(51) Int. Cl.
*F16H 63/38* (2006.01)

(52) U.S. Cl.
CPC .................. *F16H 63/38* (2013.01)

(58) Field of Classification Search
None
See application file for complete search history.

(56) References Cited

FOREIGN PATENT DOCUMENTS

| DE | 102015011134 A1 | * | 3/2017 | ....... B60R 25/02105 |
|----|-----------------|---|--------|----------------------|
| FR | 3034479 A1 | * | 10/2016 | ............. F16D 11/00 |
| IN | 201621009283 A | * | 9/2017 | |
| JP | 2013194878 A | * | 9/2013 | ............. F16H 59/04 |

* cited by examiner

*Primary Examiner* — Vicky A Johnson
(74) *Attorney, Agent, or Firm* — Dunlap Bennett & Ludwig, PLLC

(57) ABSTRACT

An improved star shift detent mechanism for an All-terrain vehicle. The improved star shift detent mechanism has a neutral-position ridge element with a trough formed therein, wherein the trough has a greater arc length and larger radius of curvature than the prior art for improving the finding of the neutral position. Relatedly, the remaining ridge elements of the improved star shift detent mechanism have the same spacing as the prior art but have smaller amplitudes, thereby enabling a smoother and faster selection of gears.

6 Claims, 3 Drawing Sheets

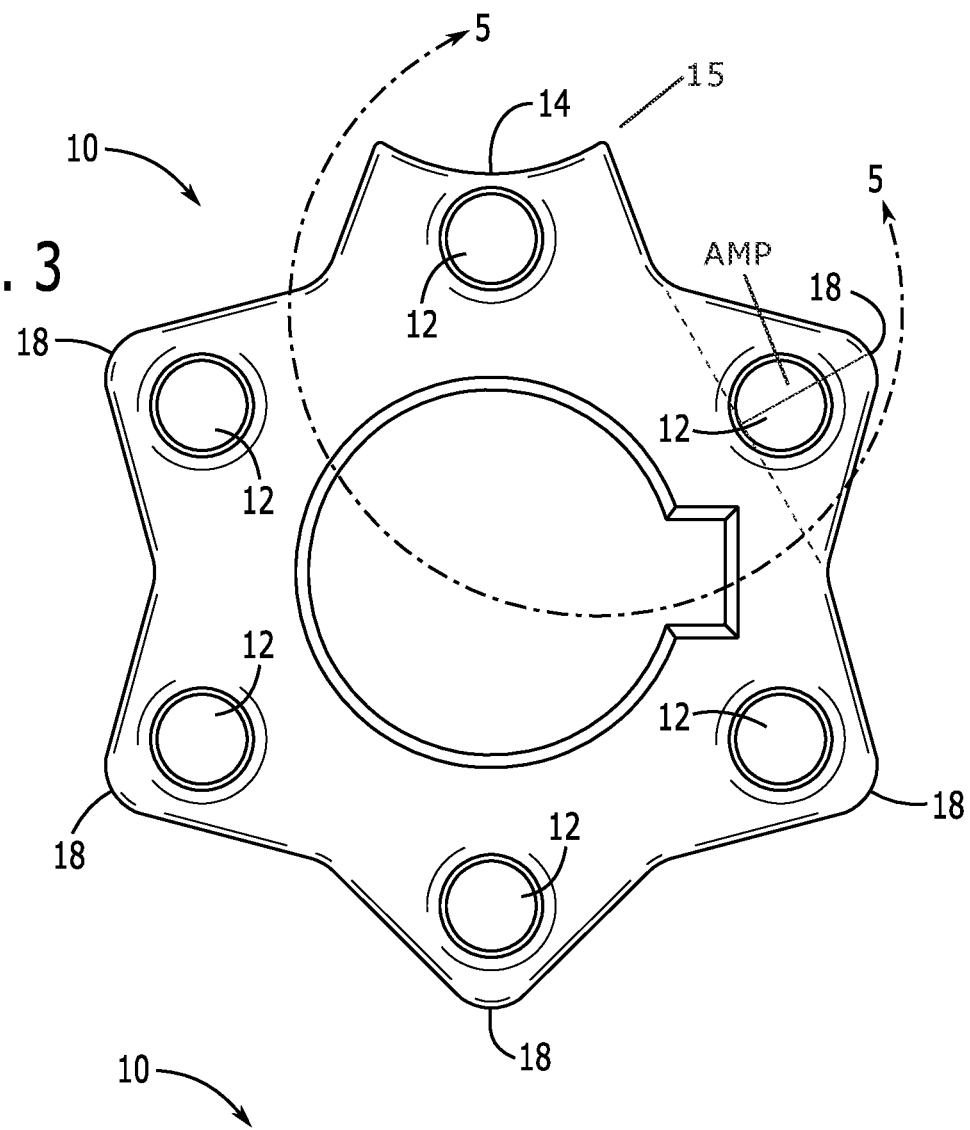
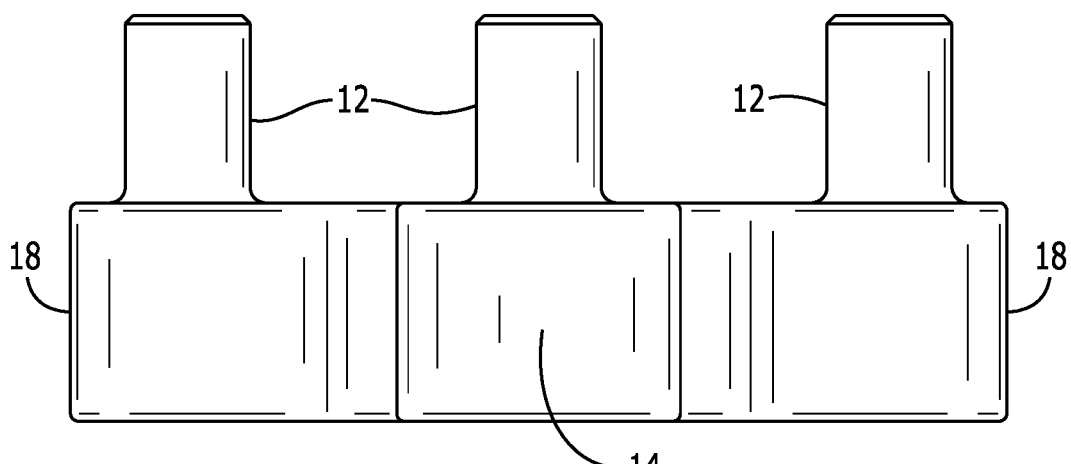

UPGRADED SHIFT STAR FOR ALL-TERRAIN VEHICLES AND A METHOD OF IMPROVING THE TRANSMISSION THEREOF

BACKGROUND OF THE INVENTION

The present invention relates to All-terrain vehicle transmission systems and, more particularly, an upgraded star shift detent mechanism for All-terrain vehicles, including but not limited to the 2004-2013 YAMAHA RAPTOR 350 & 1987-2004 YAMAHA WARRIOR 350 All-terrain vehicles and/or quads, and a method of improving the transmissions thereof.

An all-terrain vehicle (ATV), also known as a light utility vehicle, a quad bike, or simply a quad, as defined by the American National Standards Institute (ANSI), is a vehicle that travels on low-pressure tires, with a seat that is straddled by the operator, along with handlebars for steering control.

Riders of ATVs and related machine have, however, difficulty find/selecting the neutral position in the gear box/transmission. The main reason for this is the geometry and profiling of the star shift detent mechanism, which is a mechanism responsible for proper shifting of gears. On the star shift detent mechanism, one of the ridges is ground off forming a trough instead of a ridge like the other ridges of the shift star detent mechanism. This trough is between first and second gear so that a spring-biased roller that operatively associates with the star shift detent mechanism to facilitate the shifting of the gears can briefly rest on this ground off surface/trough, which in turn enables the operatively associated shifter drum to stop at the neutral position. Thus, the trough is associated with the neutral position. The trough is defined on each side by a peak.

Current shift star detent mechanisms have a neutral position trough that is too shallow and narrow, causes the roller to roll in-and-out of the desire neutral position and into second gear. The only currently available star shift detent mechanisms are Original Equipment Manufacturer (OEM) ones, which have the same geometry and profile of the prior art, and thus the same disadvantageous: the roller rolling past the desired neutral position because the diameter of the roller bearing being too big relative to the radius of curvature of the neutral position trough and, relatedly, the narrow spacing of the bookending neutral-position peaks relative to the trough (i.e., the profile to seat defined by the narrow and shallow trough of the prior art star shift detent mechanism).

As can be seen, there is a need for an upgraded star shift detent mechanism (or "shift star") for All-terrain vehicles, including but not limited to the 2004-2013 YAMAHA RAPTOR 350 & 1987-2004 YAMAHA WARRIOR 350 All-terrain vehicles and/or quads, and a method of improving the transmissions thereof.

The neutral-position trough of the star shift detent mechanism of the present invention is deeper and wider in radially profile than the prior art, enabling the OEM bearing of the stopper level roller to fully seat in the neutral position trough. The pointed profiles of the neutral-position peaks of the star shift detent mechanism have a lower and smoother profile, thereby increasing the seat for the roller bear to "find".

In sum, the upgraded star shift detent mechanism embodied in the method of improving the transmissions an ATV results in an improvement in finding the neutral position.

The remaining ridges and valleys transitioning between second and third gears, third and fourth gears, etc. have a diminished amplitude, though similar wavelength, compared to the prior art star shift detent mechanisms, thereby engendering a smoother and faster selection of gears.

SUMMARY OF THE INVENTION

In one aspect of the present invention, a method of improving a star shift detent mechanism of an all-terrain vehicle, the method includes: increasing an arc length of a trough of a neutral-position ridge element of a plurality of ridge elements of the star shift detent mechanism by approximately fifty to three hundred percent; and maintaining a radially spacing of the remaining ridge elements of the plurality of ridge elements, wherein an amplitude for each of said remaining ridge elements decreases at least twenty percent, wherein an angle of incidence (AOI) between the neutral-position ridge element and an adjacent ridge element decreases at least ten percent, wherein a spacing between the two peaks that define the trough are increased approximately forty percent, and wherein the arc length is approximately 8.8 millimeters.

In another aspect of the present invention, a star shift detent mechanism having a plurality of ridge elements includes the following: a neutral position ridge element having a curved seat having an arc length of approximately 8.8 millimeters; and the remaining ridge elements of the plurality of ridge elements having an amplitude of approximately 2.8 millimeters.

These and other features, aspects and advantages of the present invention will become better understood with reference to the following drawings, description and claims.

BRIEF DESCRIPTION OF THE DRAWINGS

FIG. 3 is a top plan view of an exemplary embodiment of the present invention.

FIG. 4 is a front elevation view of an exemplary embodiment of the present invention.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides an improved star shift detent mechanism for an All-terrain vehicle. The improved star shift detent mechanism has a neutral-position ridge element with a trough has a greater arc length and larger radius of curvature than the prior art for improving the finding of the neutral position. Relatedly, the remaining ridge elements of the improved star shift detent mechanism have the same spacing as the prior art but have smaller amplitudes, thereby enabling a smoother and faster selection of gears.

Figure 1:
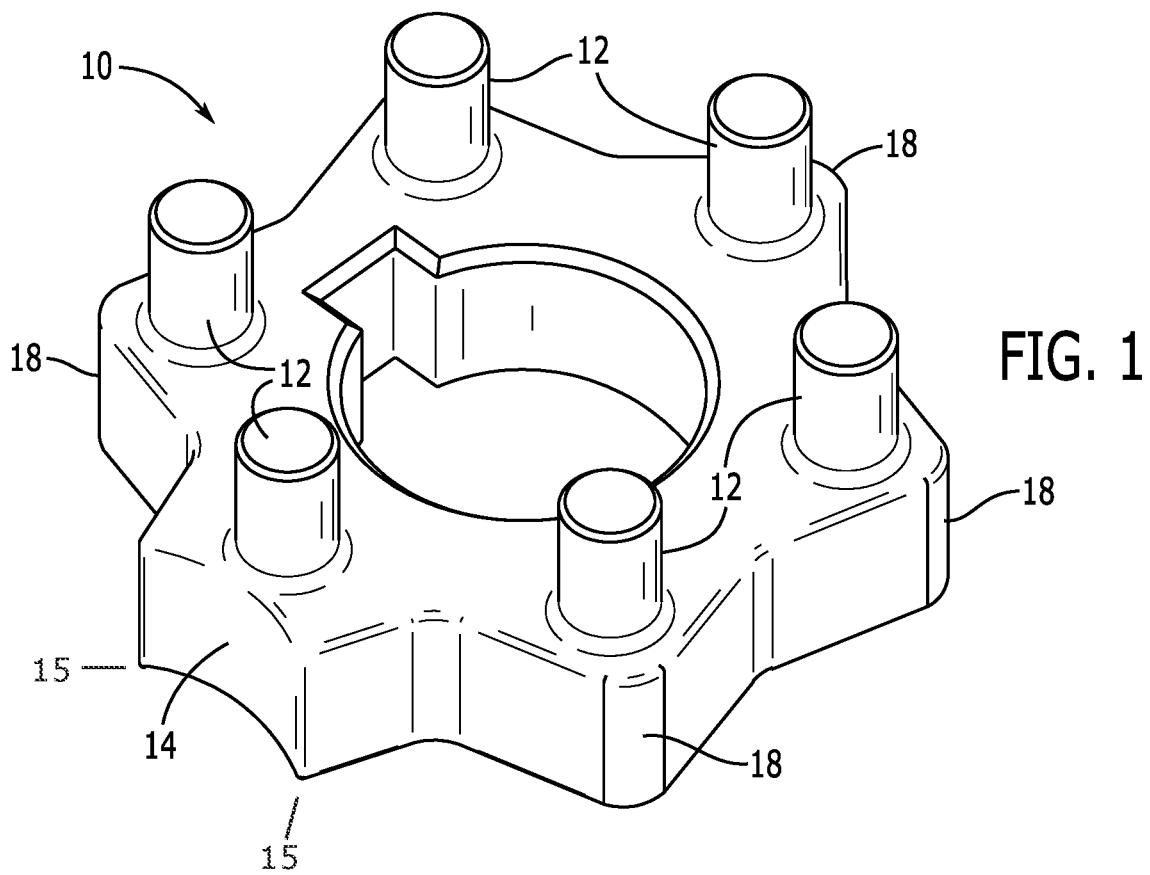
FIG. 1 is a top perspective view of an exemplary embodiment of the present invention.
Figure 2:
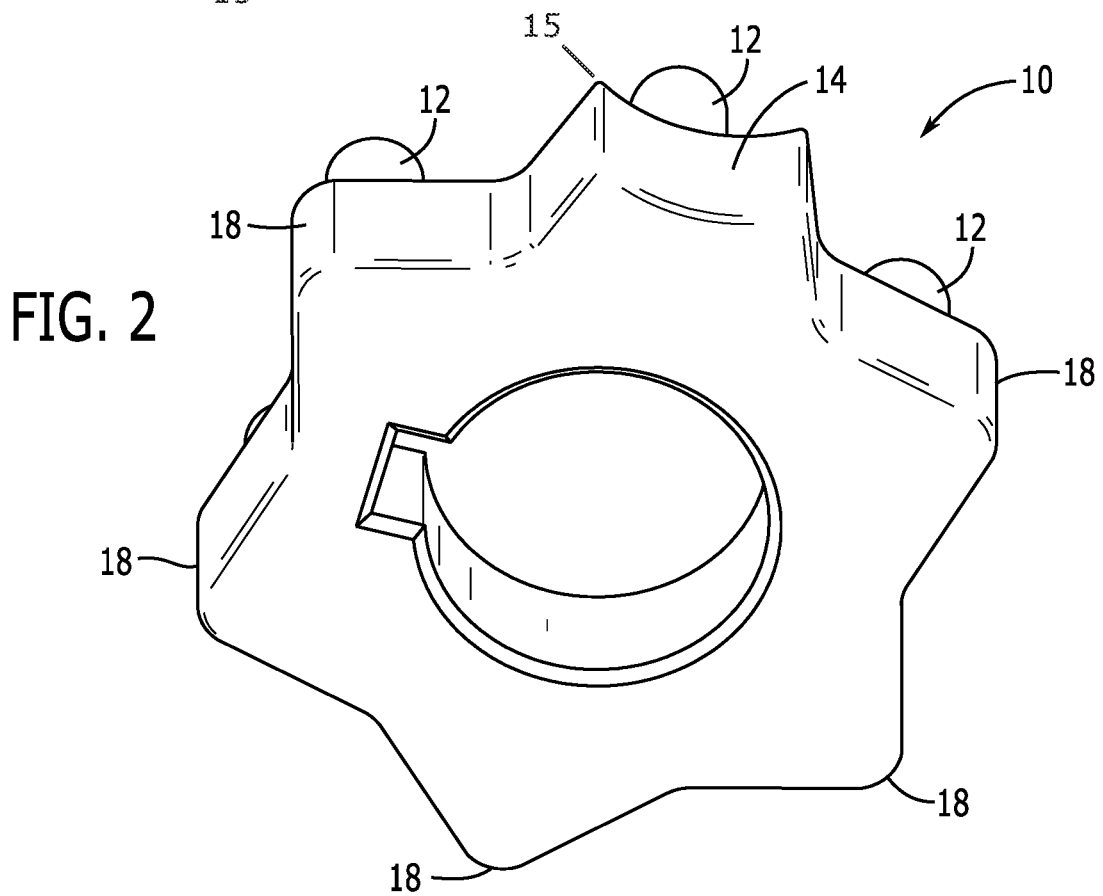
FIG. 2 is a bottom perspective view of an exemplary embodiment of the present invention.
Figure 5:
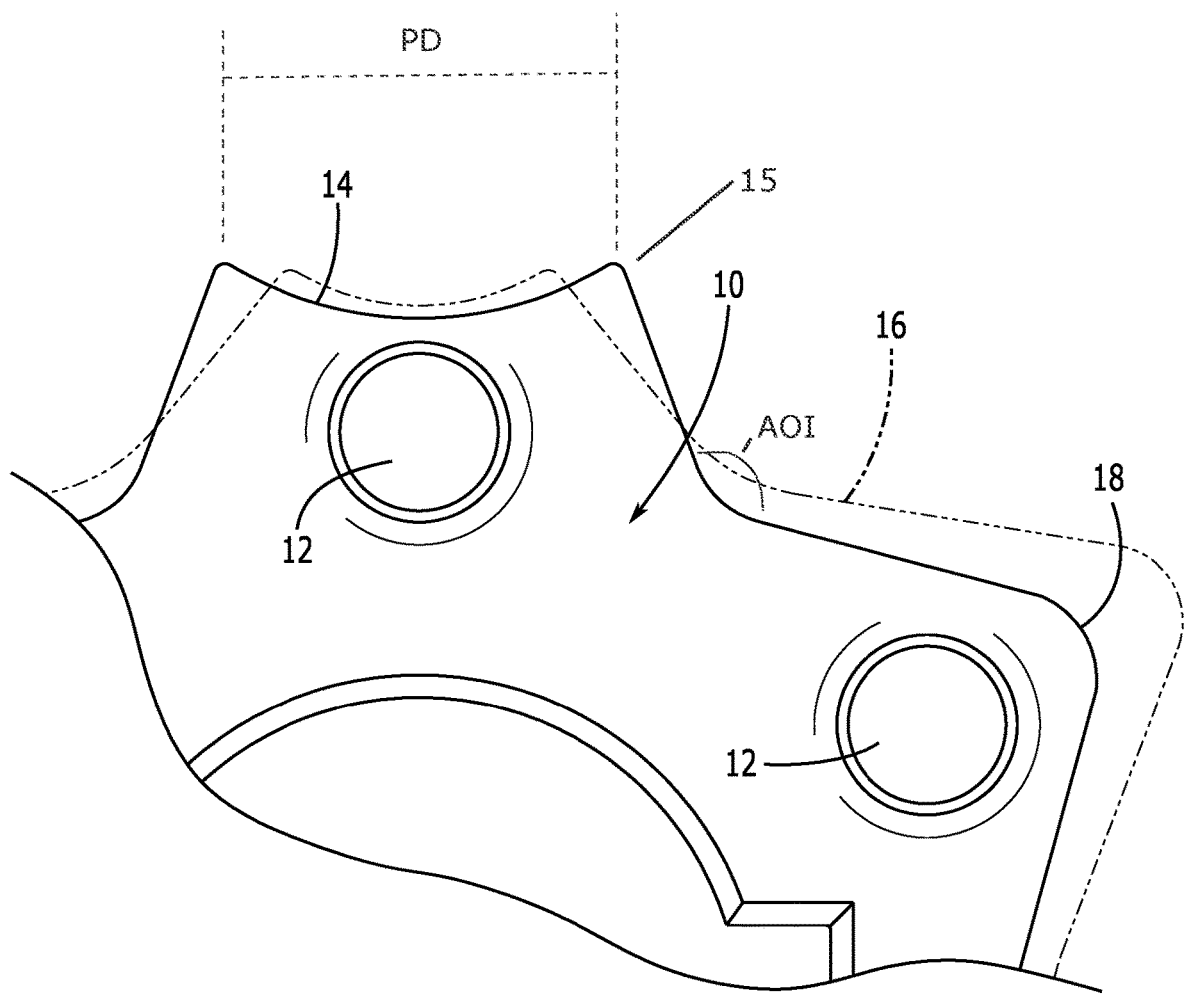
FIG. 5 is a detailed partial top view of an exemplary embodiment of the present invention, as indicated along line 5-5 in FIG. 3.

Referring now to FIGS. 1 through 5, the present invention may include a novel star shift detent mechanism for an ATV.

In ATVs, the torque and rpm of a wheel is controlled by manually shifting a gear lever (not shown). The ATV's gear box comprises of a series of different gear steps which can be switched according to the demands of the driver engaging said gear lever. The gear lever is connected to a shifter shaft (not shown), and the other end of the shifter shaft is connected to a ratchet mechanism. The purpose of the ratchet mechanism is to rotate the shifting drum (not shown) at specific angles to activate operatively associated gears between input and output shafts of the transmission system.

In a constant mesh transmission system, each gear on the input shaft is engaged with each corresponding gear mates on the output shaft. Because of how this transmission system works, before shifting from one gear to another gear the previously locked gear returns to neutral position first, only then does it slidably engage the other gear to achieve power transmission. In effect, there is a neutral condition in-between every successive gear. Though, a user truly "finds" a neutral position only in between first and second gears because of how said ratchet mechanism that operatively associates with one or more pins 12 of a star shift detent mechanism.

The star shift detent mechanism (SSDM) 10 is responsible for proper shifting of gears. The SSDM 10 has ridges and valleys. A spring-biased roller (not shown) rolls to these ridges 18 and valleys 16. The position of the roller at each ridge 18 of the SSDM 10 corresponds to a neutral condition or position. In the neutral condition, the roller cannot rest on the smooth ridges 18 of the SSDM 10 and immediately disposes to the appropriate valley 16, preventing the shifting drum from stopping at a neutral position (which is why the user can only "find" the neutral position between first and second gears). One of the ridges, however, is ground off. This is done in between first and second gear so that the roller can briefly rest on this ground off surface or trough 14, thus enabling the shifter drum to stop at the neutral position instead of shifting directly to second gear.

Accordingly, for every pin 12 of the SSDM 10, there is an associated ridge element 18. As mentioned above, between each two adjacent ridge elements 18 is a valley 16 associated with a gear of the transmission. Thus, there is an alternative succession of ridge elements 18 and valleys 16. In total there are six radially equidistant ridge elements 18 and valleys 16, and so for a 360-degree detent mechanism the ridge elements 18 are evenly spaced apart, having the same "wavelength".

As mentioned above, the ridge element 18 associated with the neutral position has its own trough 14 or neutral-position trough that is bookended by peaks 15. The radius of curvature of the trough 14 may be approximately 8 millimeters (mm) as compared to the radius of curvature of approximately 4 mm associated with the prior art. A peak distance (PD) between the peaks 15 may be approximately 8.5 mm as compared to the distance of approximately 6 mm associated with the prior art. As a result, the trough 14 may have an arc length of approximately 8.8 mm as compared to the arc length of approximately 2.9 mm associated with the prior art.

As a result of these geometrical changes, the amplitude (AMP) of the remaining ridge elements 18 may be approximately 2.8 mm as compared to the amplitude of approximately 4 mm associated with the prior art. Note, the "wavelength" or radial spacing of the ridge elements 18/pins 12 remains unchanged so the present invention can replace the OEM star shift detent mechanism without missing a beat.

A method of using the present invention includes the following. The SSDM 10 disclosed herein is provided. A user then removes the side cover of the motor, remove the existing shift star, replaces with the redesigned SSDM 10, and reinstalls the side cover.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A method of improving a star shift detent mechanism of an all-terrain vehicle, the method comprising:
   increasing an arc length of a trough of a neutral-position ridge element of a plurality of ridge elements of the star shift detent mechanism by approximately three hundred percent; and
   maintaining a radially spacing of the remaining ridge elements of the plurality of ridge elements.

2. The method of claim 1, wherein an amplitude for each of said remaining ridge elements decreases at least twenty percent.

3. The method of claim 2, wherein an angle of incidence between the neutral-position ridge element and an adjacent ridge element decreases at least ten percent.

4. The method of claim 3, wherein a spacing between the two peaks that define the trough are increased approximately forty percent.

5. The method of claim 4, wherein the arc length is approximately 8.8 millimeters.

6. A star shift detent mechanism having a plurality of ridge elements, comprising:
    a neutral position ridge element having a curved seat having an arc length of approximately 8.8 millimeters; and
    the remaining ridge elements of the plurality of ridge elements having an amplitude of approximately 2.8 millimeters.

\* \* \* \* \*